United States Patent
Impera et al.

(10) Patent No.: US 10,762,703 B2
(45) Date of Patent: Sep. 1, 2020

(54) VISUALIZATION OF 3D IMAGE DATA

(71) Applicant: SICK AG, Waldkirch (DE)

(72) Inventors: Davide Impera, Waldkirch (DE); Thomas Neumann, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/418,983

(22) Filed: May 21, 2019

(65) Prior Publication Data

US 2019/0362549 A1 Nov. 28, 2019

(30) Foreign Application Priority Data

May 22, 2018 (EP) .................................. 18173463

(51) Int. Cl.
*G06T 17/20* (2006.01)
*G06T 7/593* (2017.01)
*H04N 13/204* (2018.01)
*H04N 13/271* (2018.01)
*G06T 15/60* (2006.01)
*G06T 7/194* (2017.01)

(52) U.S. Cl.
CPC .............. *G06T 17/20* (2013.01); *G06T 7/593* (2017.01); *G06T 15/60* (2013.01); *H04N 13/204* (2018.05); *H04N 13/271* (2018.05); *G06T 7/194* (2017.01); *G06T 2200/08* (2013.01); *G06T 2207/10028* (2013.01); *G06T 2207/30108* (2013.01); *G06T 2207/30232* (2013.01)

(58) Field of Classification Search
CPC ......... G06T 7/187; G06T 7/136; G06T 17/20; G06T 7/11; G06T 7/593; G06T 15/60; G06T 7/194; G06T 2207/30108; G06T 2200/08; G06T 2207/30232; G06T 2207/10028; H04N 13/271; H04N 13/204
See application file for complete search history.

(56) References Cited

U.S. PATENT DOCUMENTS

| | | | |
|---|---|---|---|
| 7,003,136 B1 | 2/2006 | Harville | |
| 9,235,928 B2 | 1/2016 | Medioni et al. | |
| 2005/0017969 A1* | 1/2005 | Sen | G06T 15/04 345/419 |
| 2005/0168460 A1* | 8/2005 | Razdan | G06F 16/904 345/419 |
| 2006/0239558 A1* | 10/2006 | Rafii | G06K 9/00201 382/181 |
| 2012/0307010 A1* | 12/2012 | Evertt | G06T 7/70 348/46 |
| 2016/0026184 A1* | 1/2016 | Stainvas Olshansky | G05D 1/024 356/4.01 |

(Continued)

FOREIGN PATENT DOCUMENTS

DE 102005063217 B4 5/2014

*Primary Examiner* — Ke Xiao
*Assistant Examiner* — Andrew Shin
(74) *Attorney, Agent, or Firm* — Nath, Goldberg & Meyer; Jerald L. Meyer

(57) ABSTRACT

A method for visualizing 3D image data of a 3D sensor (10) with a plurality of 3D points which form a lateral 2D arrangement with a respective depth value, wherein connected segments (32) are formed from connected 3D points and the segments (32) are displayed, and wherein two respective 3D points are connected in the same segment (32) if they are laterally adjacent and also differ in their depth value by at most a depth threshold (z).

19 Claims, 10 Drawing Sheets

(56) References Cited

U.S. PATENT DOCUMENTS

Figure 1:
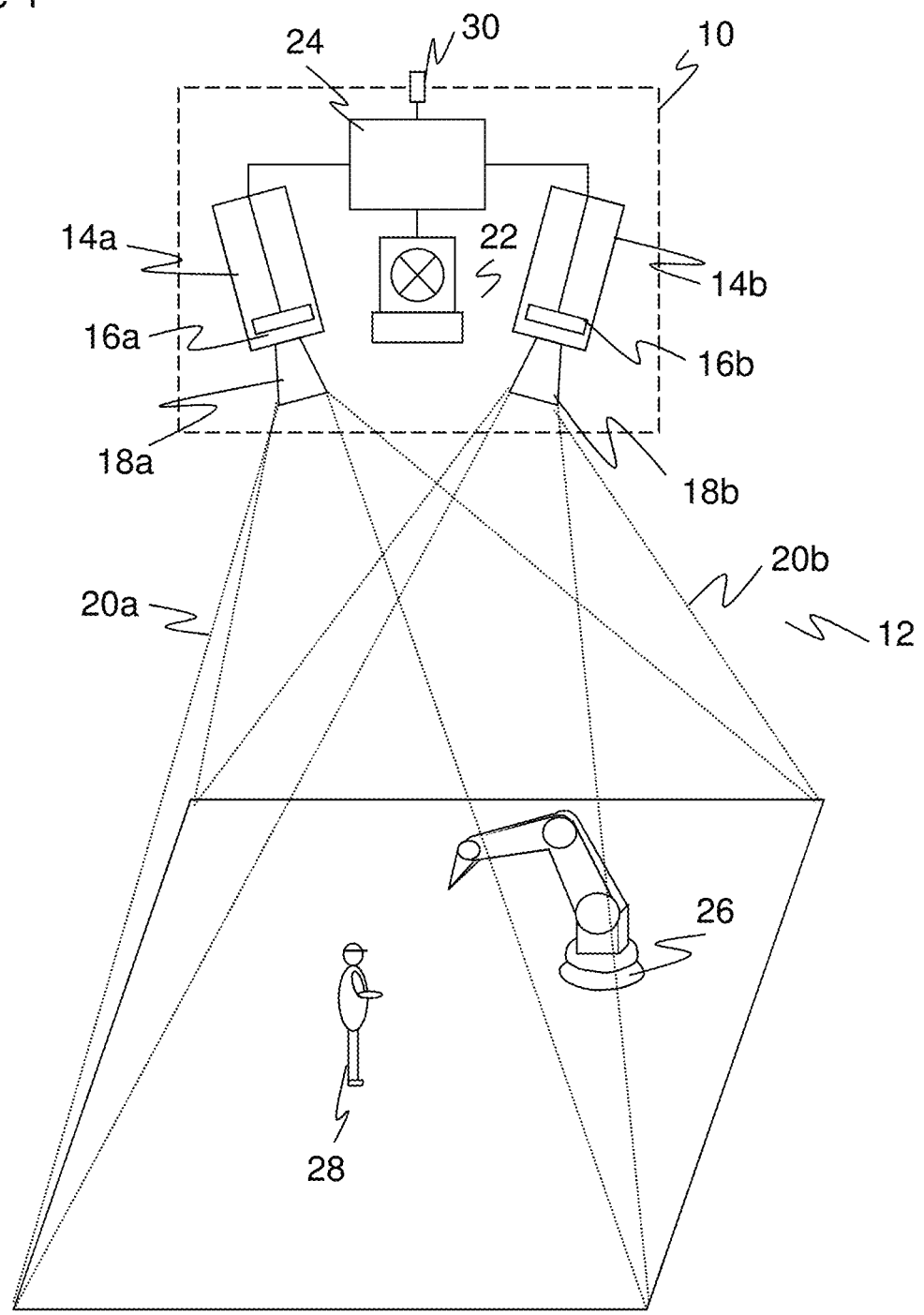

| | | |
|---|---|---|
| 2016/0078610 A1 | 3/2016 | Rudd et al. |
| 2016/0171706 A1* | 6/2016 | Somanath ................. G06T 7/11 |
| | | 382/154 |
| 2016/0307367 A1 | 10/2016 | Chuang et al. |
| 2018/0336724 A1* | 11/2018 | Spring ...................... G06T 7/70 |
| 2019/0271767 A1* | 9/2019 | Keilaf ................... G01S 7/4863 |
| 2019/0291723 A1* | 9/2019 | Srivatsa ............. G06K 9/00208 |

* cited by examiner

VISUALIZATION OF 3D IMAGE DATA

The invention relates to a method for visualizing 3D image data of a 3D sensor with a large number of 3D points.

The primary goal of safety technology is to protect people from danger such as machines in industrial environments. The machine is monitored by sensors, and if there is a situation in which a person is in danger of getting too close to the machine, an appropriate safety measure is initiated.

3D sensors are among the sensors used for this kind of monitoring. This includes 3D cameras in various technologies, such as stereoscopy, triangulation, light time of flight or evaluation of the distortions of passive two-dimensional patterns or projected illumination patterns. In contrast to a conventional two-dimensional camera, 3D sensors acquire images that contain a distance value in their pixels. These depth-resolved or three-dimensional image data are also known as depth maps. Moreover, laser scanners that scan in two or all three directions are also known, which also acquire three-dimensional image data in the form of the respective scanning angles and the measured distance. The larger device and evaluation effort required to generate three-dimensional image data as compared to two-dimensional image acquisition is justified in many applications by the additional information.

Sensors used in safety technology or for the protection of persons have to be particularly reliable and therefore meet high safety requirements, such as the EN13849 standard for machine safety and the IEC61496 or EN61496 device standard for electro-sensitive protective devices (ESPE). In order to meet these safety standards, a number of measures must be taken, such as safe electronic evaluation by redundant, diverse electronics, function monitoring or monitoring of the contamination of optical components. In safety applications, it is typically required that an object having a certain minimum size or certain minimum dimensions is reliably detected. This property is called detection capability.

According to the usual safety concept, protection zones are configured which must not be entered by operating personnel during machine operation. If the sensor detects an inadmissible protection zone violation, such as an operator's leg, it triggers a safety-related stop of the machine. In an alternative so-called speed-and-separation monitoring it is monitored whether a necessary safety distance is maintained between the danger zone and the object.

During setup of such safety applications, the protection zones or danger zones must be configured. This can better be done if the 3D sensor provides a visualization of the observed scenery that is as easy and intuitive as possible to grasp.

One possibility is to display the depth maps themselves in the form of a 2D image with the distances coded using gray values or false colors. However, this is not an intuitive, but an artificial visualization of the spatial environment, which makes it difficult for users to judge the scenery in three-dimensional space. In addition, shaded areas are not visible from the camera perspective and also cannot be imagined. In addition, vertical surfaces of both actual and virtual, i.e. configured, objects always seem to be distorted due to the central perspective.

Alternatively a representation as a point cloud is conceivable. The points, which in themselves are dimensionless, are shown as three-dimensional spheres, cubes or 2D sprites, i.e. 2D surfaces that are always directed to the observer. The points are arranged in space separately from one another, and the observer has the task of forming objects. No surface is visualized between points, there is no texturing. Invalid areas where there are no valid measuring points simply remain empty and are hardly recognizable. Shadows cannot be intuitively located in space.

Furthermore, a representation as surface mesh is known. Each quadrangle formed by adjacent points is modelled with two triangles. This creates a continuous surface that can also be textured. However, a surface mesh does not take the object boundaries or background data into account. A surface is modelled between all points, regardless of whether the objects in the scenery were actually connected. In particular, transitions between foreground objects and background are straight surfaces due to the central perspective, although there are no real objects in this area of the shadow boundaries.

Actual object surfaces, background and shadowing boundaries are thus visualized indistinguishably from one another. This poses considerable difficulties to understand the scenery and the measured objects.

DE10 2005 063 217 B4 discloses a method for configuring protection zones for a stereo camera. For this purpose, a three-dimensional image of the spatial area is recorded and displayed. However, the image of the scenery is simply a two-dimensional live image of the scenery with superimposed virtual geometric elements.

In US2016/0078610 A1, point clouds of several cameras are merged. However, an improved visualization is not achieved in this way.

From US 2016/0307367 A1 is also known to combine point clouds from several perspectives. A mesh is constructed from that, but the specific method for this is not explained. The mesh can afterwards be thinned out. The above problems of visualization by a surface mesh are therefore not discussed, let alone solved.

According to U.S. Pat. No. 9,235,928 B2, a 3D body model is created from a 3D point cloud. Cylindrical body segments are defined, which is not a reasonable assumption for the general evaluation of an industrial scenery.

U.S. Pat. No. 7,003,136 B1 is concerned with object tracking, wherein 3D image data are projected in horizontal planes. As a partial step a foreground segmentation is provided, which cuts off the background in heights close to the ground. However, intuitive visualization is not achieved and not even aimed at.

It is therefore an object of the invention to improve the visualization of 3D image data of a 3D sensor.

This object is satisfied by a method for visualizing 3D image data of a 3D sensor with a plurality of 3D points which form a lateral 2D arrangement with a respective depth value, in particular a depth map, wherein connected segments are formed from connected 3D points and the segments are displayed, and wherein two respective 3D points are connected in the same segment if they are laterally adjacent and also differ in their depth value by at most a depth threshold ($z$).

The 3D sensor detects distances to objects in a monitoring area. The generated 3D points laterally, i.e. transverse to the direction of detection of the 3D sensor, form a 2D arrangement since the sensor measures only one distance per line of sight. In the following, the coordinates of the lateral 2D arrangement from the sensor's point of view are referred to as $(u,v)$. A typical example is a depth map, i.e. a 2D matrix corresponding to the pixels in the image of a conventional 2D image sensor, with the additional feature that the pixels $(u,v)$ represent depth values corresponding to the measured distances. Connected 3D points are combined into connected segments (CCL, Connected Components Labeling) and these segments are then displayed.

The object is also satisfied by an optoelectronic 3D sensor, in particular a 3D camera or a stereo camera, having
- at least one light receiver for acquiring 3D image data from a monitoring region,
- a control and evaluation unit which is configured for a method of visualizing acquired 3D image data with a plurality of 3D points which form a lateral 2D arrangement with a respective depth value, wherein connected segments are formed from connected 3D points and the segments are displayed, and wherein two respective 3D points are connected in the same segment if they are laterally adjacent and also differ in their depth value by at most a depth threshold (z)
- and a display for displaying the 3D image data.

The invention starts from the basic idea of extending segmentation by a height threshold. Potentially connected in a segment are neighbors in the lateral 2D arrangement, in particular neighbor pixels in the depth map. However, an additional condition is required depending on the depth values. Neighbors therefore only belong to the same segment if their depth values differ by at most a depth threshold. Since the depth direction is regularly referred to as the Z-axis, the extended method according to the invention can be referred to as Δz-limited Connected Components Labeling (CCL).

The invention has the advantage that an attractive and fast three-dimensional visualization of 3D image data is possible. Objects are displayed in plausible segments and can be intuitively located in the three-dimensional scenery. The visual processing is efficient, flexible and fast. In addition, the visualization can easily be extended with additional data, such as texturing, a shadowing representation, application data, configuration data or other measurement data. The procedure is not platform dependent and can therefore be implemented in any environment, such as a desktop PC, a web browser or as embedded software in the 3D sensor or a controller connected to it. The perspective is preferably freely selectable.

3D points preferably are laterally adjacent if they are arranged side by side, one above the other or in diagonal proximity within the 2D arrangement. Direct and/or diagonal neighbors, preferably all of them, are thus included in the neighborhood relationship during segmentation. In a depth map with a regular grid of the lateral 2D arrangement, this is an 8-neighbourhood, i.e. the eight points forming a square around the center point. It turned out that particularly comprehensible visualizations are achieved in that way, which for example are better than in a 4-neighbourhood that is an alternative option, i.e. a neighborhood of only direct neighbors without diagonal neighbors. Throughout this specification, the terms preferred or preferably refer to an advantageous, but completely optional feature.

A surface mesh preferably is formed for a connected segment and the segment is displayed as the associated surface mesh. By means of a surface mesh of the segments found, in particular a triangular mesh, the relationships between objects can be intuitively understood, quite differently from a point cloud. Because of the previous Δz-limited CCL segmentation, only relevant surfaces are shown. There are no confusing surface representations at transitions between objects or between object and background as with conventional surface meshes. As far as such transitions are still displayed, in particular shadowing, the visualization is aware that these are not object surfaces, which therefore can be displayed in a special way, so that their nature is immediately recognized, or which can optionally be hidden.

Triangles of the surface mesh are preferably formed from 3D points which already are direct neighbors in the lateral 2D arrangement. With the coordinates introduced above, the coordinates of such triangles (u,v) differ only by one, as for example in the triangle (u,v), (u+1,v), (u,v+1). In the triangle of the surface mesh, of course, the respective depth value at the three points of the triangle is also included.

A shadowing mesh for shadowing boundaries preferably is generated and displayed. The surface meshes discussed so far correspond to the connected segments and thus objects. For security applications in particular, however, it is important to detect shadowing (masking, occlusions) and to three-dimensionally place them in the scenery, because the 3D sensor is blind in these regions. It is advantageous if surface meshes and shadowing meshes are visually distinguishable, in particular by different colors, textures or particularly advantageous a (partially) transparent representation of the shadowing mesh.

Preferably, an edge mask of inner and outer edges of the segments is generated and triangles of the shadowing mesh are formed on the basis of the edge mask between adjacent, different segments. Shadowing occurs at outer object edges, so that triangles of the shadowing mesh connect adjacent edges of different connected segments. Therefore, the corner points of the triangles of the shadowing mesh are easily and reliably identified by such an edge mask. In this context, the background or in particular floor is preferably defined as an own connected segment, because some triangles of the shadowing mesh also connect object edges with the background.

The mesh preferably is displayed with a texture. This applies to a surface mesh and/or a shadowing mesh. A texture is added to the triangles that preferably encodes depth values using gray values or false colors. Both monochrome triangles, e.g. according to the depth value of a center of gravity of the triangle, and depth-dependent gray level or color gradients in the triangle are conceivable. This three-dimensional information that can be viewed with even more details is particularly helpful for the configuration of the 3D sensor. Alternatively, a texture corresponding to the actual scenery from an image acquisition is also conceivable, as this facilitates orientation in the real scenery. The texturing of a mesh is preferably a later or even final step in order to have completed meshes.

The 3D points preferably are transformed into world coordinates. First, 3D points are acquired from the perspective of the 3D sensor. In the previous nomenclature these are tuples (u,v,d), where d is the distance measured at the point (u,v). There may be invalid distance values (missing points, holes, gaps) where there is no reliable distance. With the transformation, which takes into account a known or calibrated position and perspective of the 3D sensor, the tuples are converted into world coordinates. Preferably the world coordinates are Cartesian coordinates, so that 3D points (x,y,z) result. The z-coordinate preferably corresponds to a height axis perpendicular to a base area such as the ground or floor at a height z=0. In view of the possible conversion, this description does not always clearly distinct between depth values measured by the 3D sensor and heights z. In particular, the depth threshold of the Δz-limited CCL segmentation can be a height threshold above a base area.

Preferably, 3D points whose depth value does not have to a minimum height above a base area are discarded. This is a background segmentation based on 3D points. Preferably, this is done after a transformation into world coordinates, because then it is a simple z-threshold operation with a constant threshold. In principle, a height threshold dependent on the lateral location (u,v) or the base area (x,y) is also conceivable in order to take into account the central perspective of the coordinates (u,v,d) and/or a nonplanar background. Background segmentation allows the user to distinguish the foreground from the background. It is conceivable not to ignore the background completely, but to display it clearly distinguishable. In any case, the user can recognize the foreground clearly and without confusion with the background.

Preferably, connected segments which do not reach a minimum height above a base area are discarded. This is another background segmentation which now is based on connected segments, i.e. after the Δz-limited CCL segmentation. Not only individual 3D points are discarded, but entire segments which are regarded as background. The height of a segment is for example measured by its average, center of gravity or highest point. The two background segmentations based on 3D points and connected segments, respectively, can be used individually or in combination, or not be used at all.

Preferably, missing points in the lateral 2D arrangement for which the 3D sensor has not measured a valid depth value are filled with 3D points whose depth value is determined from depth values of adjacent 3D points. This is an optional pre-processing step before Δz-limited CCL segmentation to ameliorate the effects of the previously mentioned missing points, holes, or gaps in the 3D image data on the visualization. For this purpose, invalid distances are replaced with information of the surroundings, be it by directly copying the distance value of a neighbor, by averaging between distance values of the neighbors or more generally by processing the depth map with an interpolating filter core. An interpolation would not be possible for a safety evaluation, because the health of persons must not depend on speculations about blind areas of the measurement, but an appealing visualization can very well be further improved in this way.

The resolution of the lateral 2D arrangement preferably is reduced by generating a smaller number of 3D points from the 3D points. Several adjacent 3D points of the original resolution determine the distance value of a 3D point in the reduced resolution. An interpolation or a filter with weights for the contributions of the original 3D points is conceivable. However, edges can be washed out as a result, so that in particular with strongly differing distance values of laterally adjacent 3D points, one of the original distance values is preferably retained in order to maintain the edge. The reduced resolution (downsampling) reduces the visualization effort. Preferably, the reduction in resolution depends on at least one of currently available computing capacities and the effort required for visualizing the currently acquired 3D image data. This adaptation can be made for a longer operating phase or even dynamically depending on the current complexity of the scenery. This allows a fast displaying to be maintained with limited resources.

The visualization preferably takes place during the acquisition or transfer of 3D image data. Therefore, it is possible to display the data in real time or at least close to real time, because a certain latency is almost unavoidable. For example, a livestream can be visualized with a reasonable effort due to the method according to the invention, even at fast frame rates of at least ten frames/second. Of course, an image stream can also be transferred with a time delay after the acquisition.

The 3D image data preferably are recorded by a 3D camera, in particular a stereo camera. A laser scanner is also a 3D sensor because it generates 3D point clouds, although these are limited to one scanning plane in a common laser scanner. This limitation can be eliminated by scanning in elevation or by moving several scanning beams in elevation. However, a 3D camera is preferred which can make use of any known technique, such as a time-of-flight principle with direct time-of-flight measurement of light signals or phase measurement, or distance estimation from brightness or focus positions (DFF, Depth from Focus, DFD, Depth from Defocus). Preferably, the 3D camera uses a triangulation principle in which two camera images of a moving camera or a stereo camera are correlated with each other, or alternatively an illumination pattern is correlated with a camera image in order to estimate disparities and determine distances.

The optoelectronic 3D sensor according to the invention preferably comprises at least one light receiver or image sensor for the acquisition of 3D image data from a monitored area, a control and evaluation unit such as a microprocessor or similar digital hardware component(s) and a display for displaying the 3D image data. In the control and evaluation unit, an embodiment of the method for visualizing captured 3D image data according to the invention is implemented. Both the control and evaluation unit and the display can be either in the same housing of the 3D sensor or at least partially be provided externally. The 3D sensor is preferably of a safe design, i.e. configured for a safety-related application, and meets the standards mentioned in the introduction or similar standards in order to protect a hazardous machine. The 3D sensor may be a 3D camera or other 3D sensor, in particular as listed in the previous paragraph.

Figure 2:
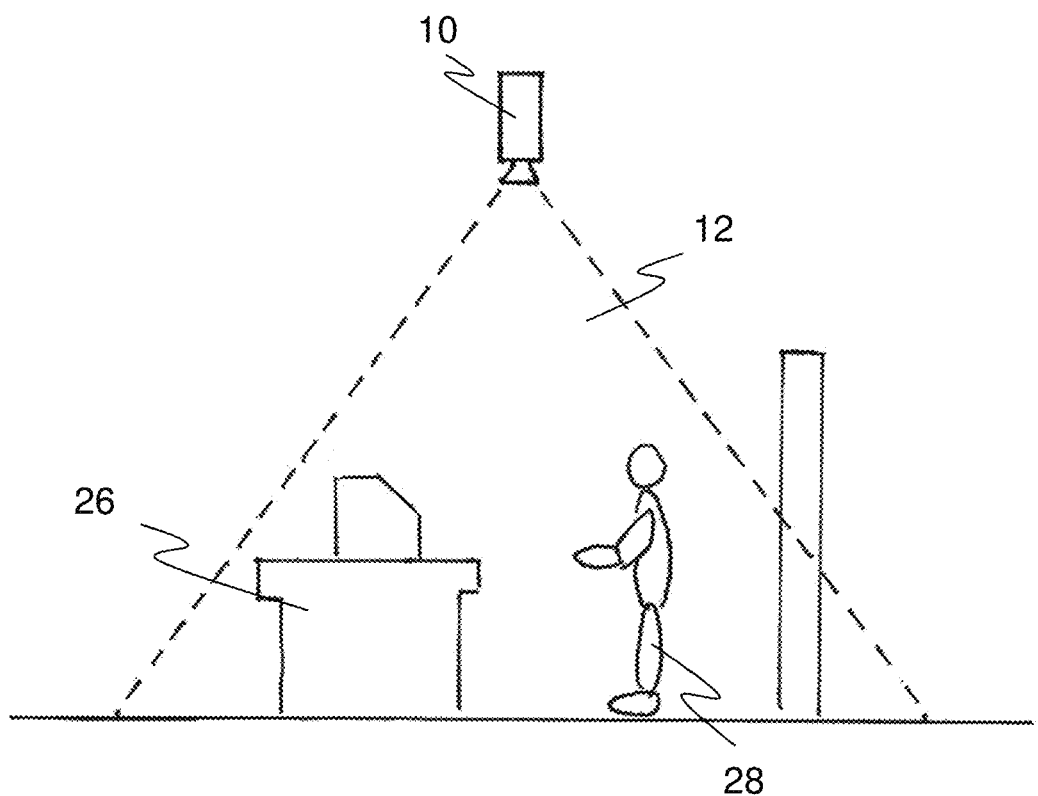
Figure 3:
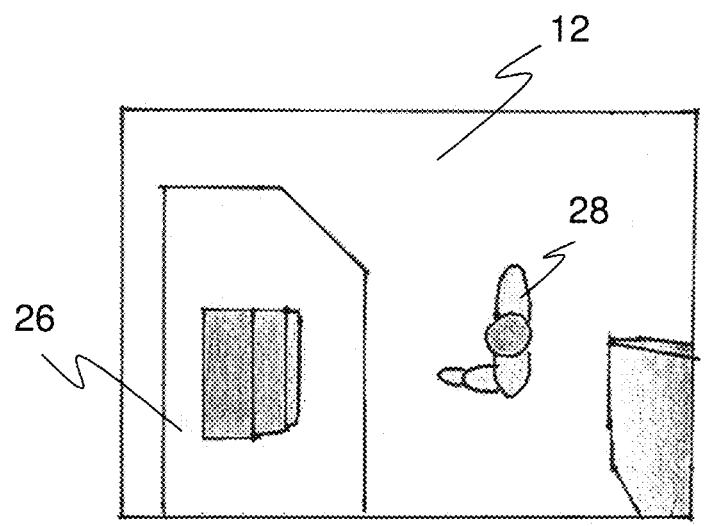
Figure 4:
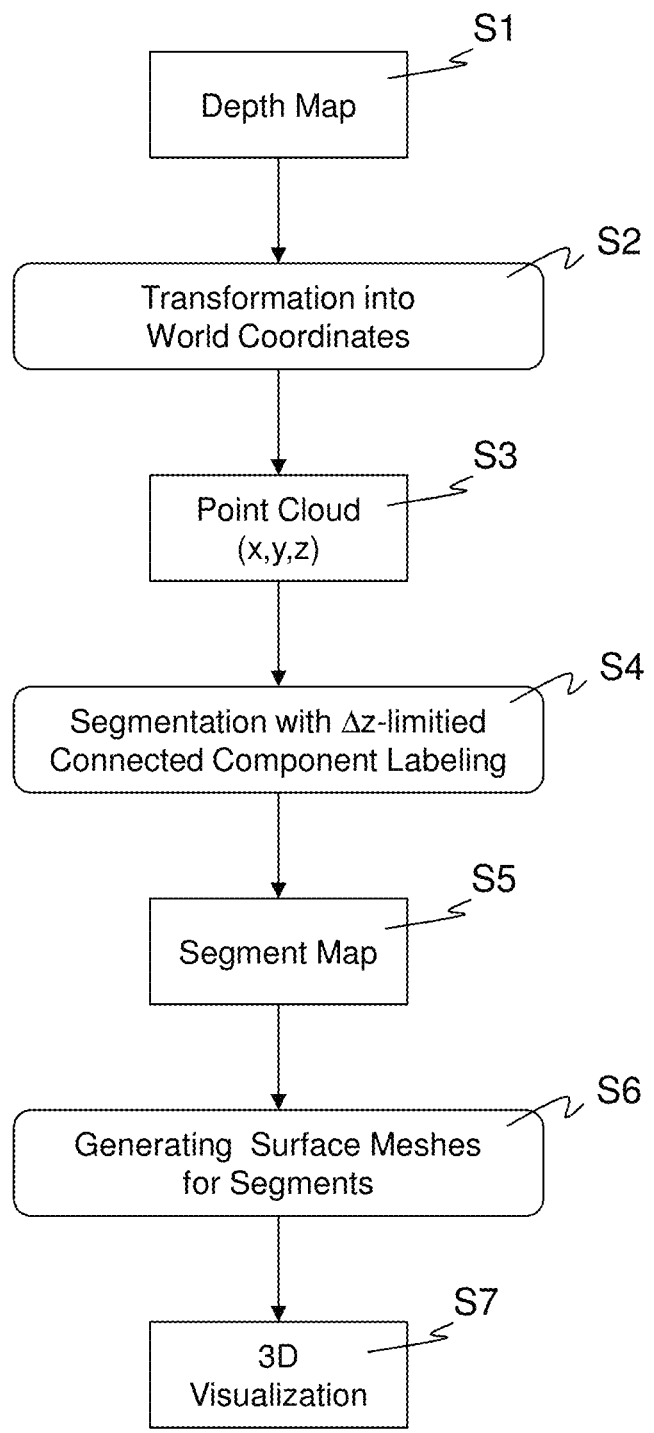
Figure 5:
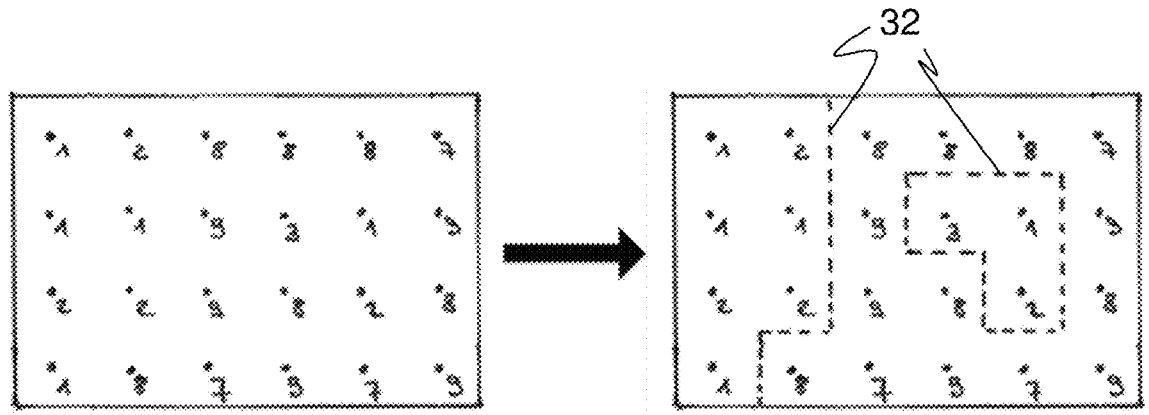
Figure 6A:
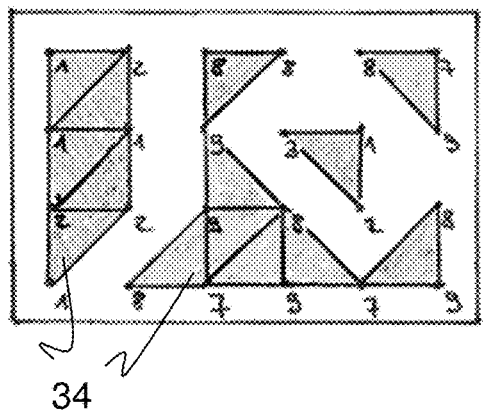
Figure 7:
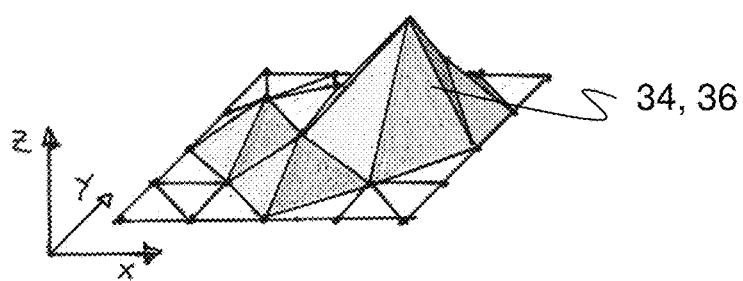
Figure 8:
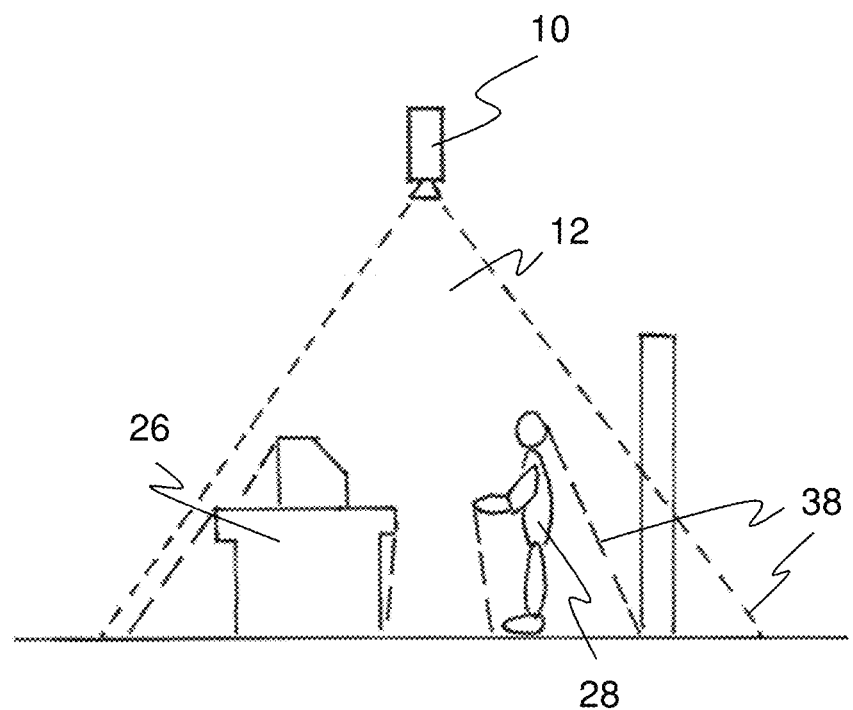
Figure 9A:
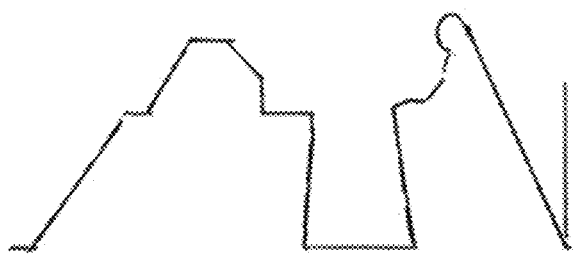
Figure 9B:
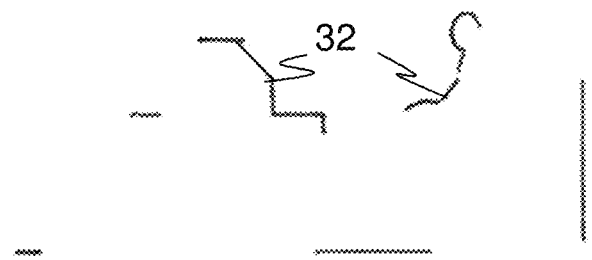
Figure 9C:
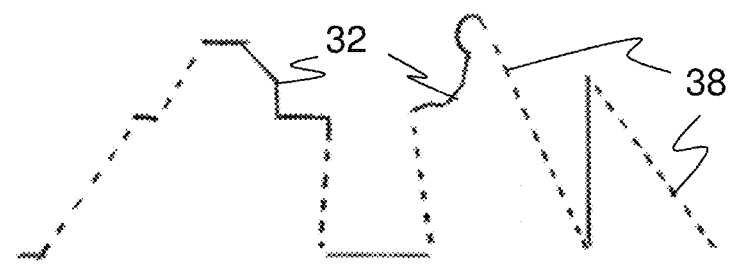
Figure 10:
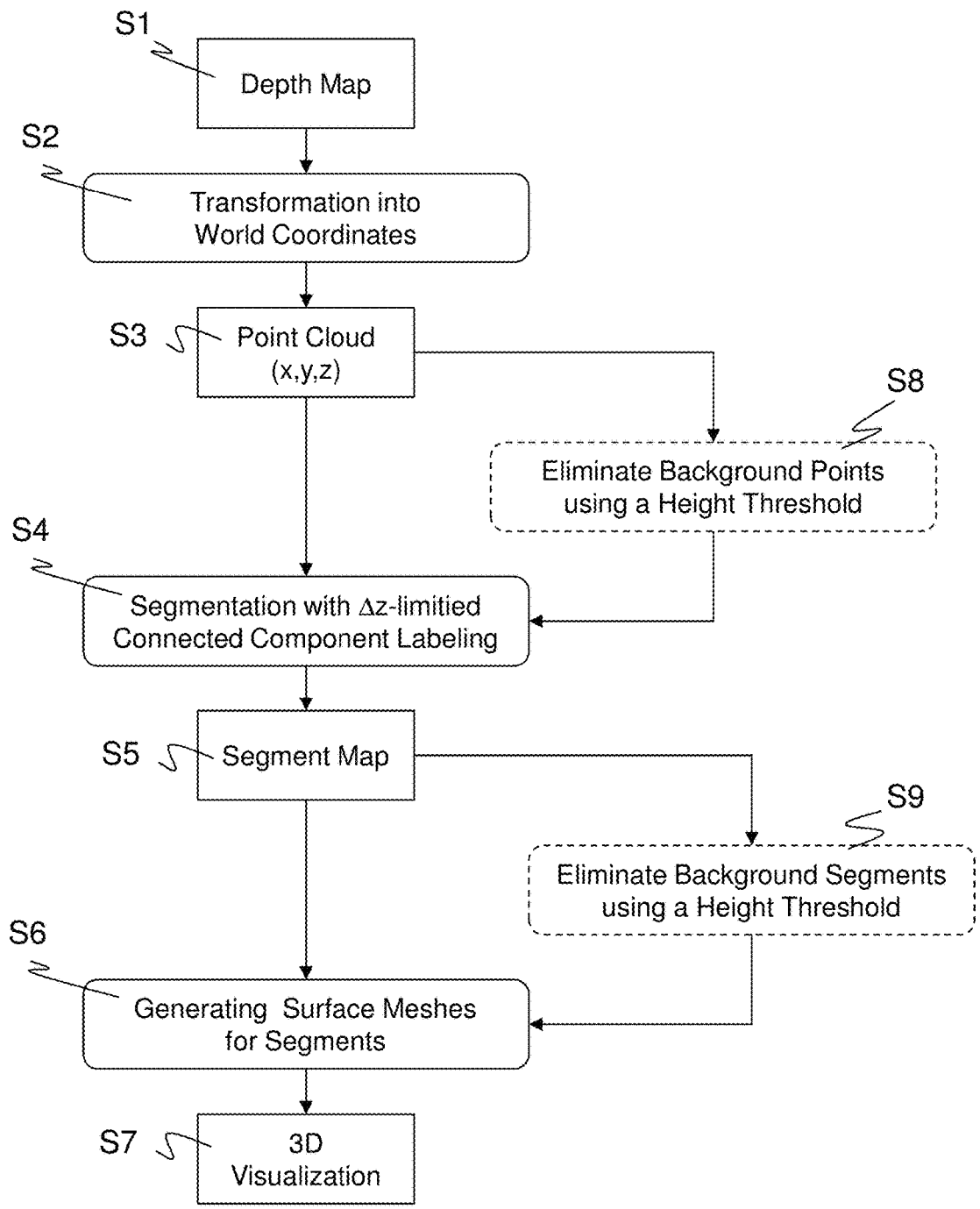
Figure 11A:
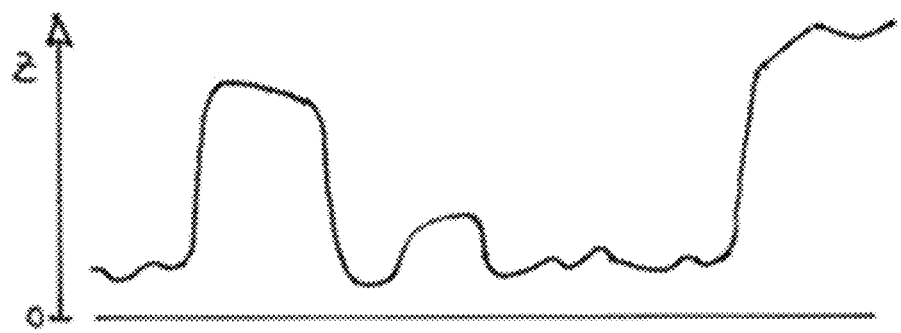
Figure 11B:
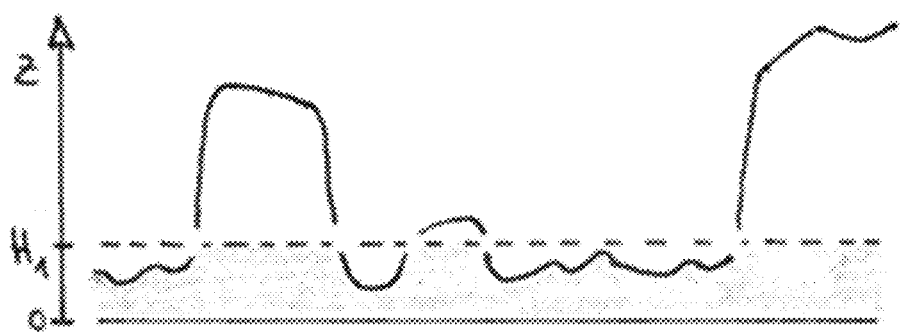
Figure 11C:
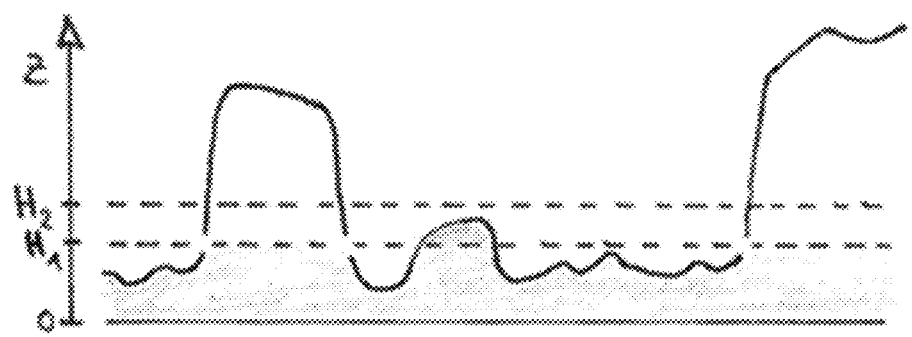
Figure 12:
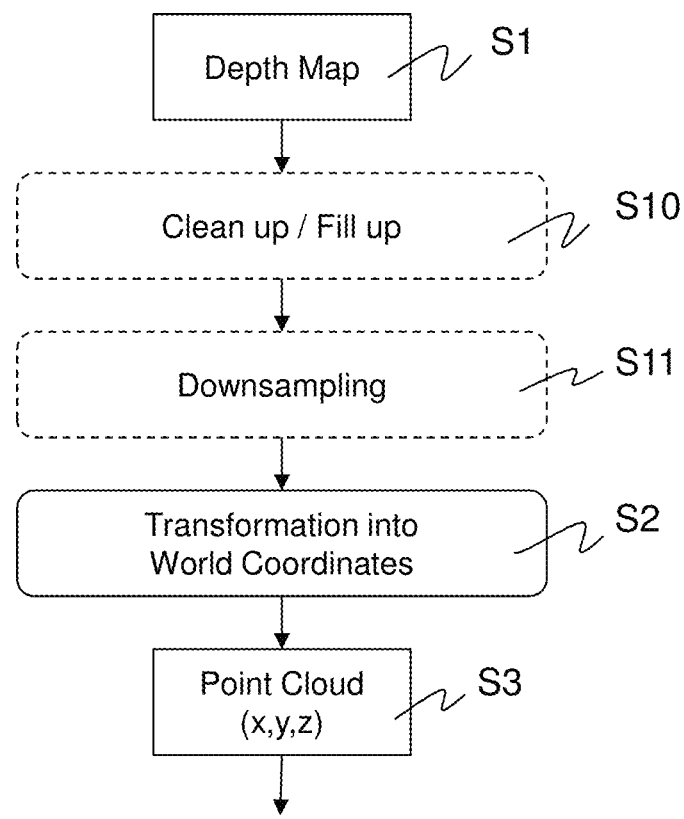
Figure 13:
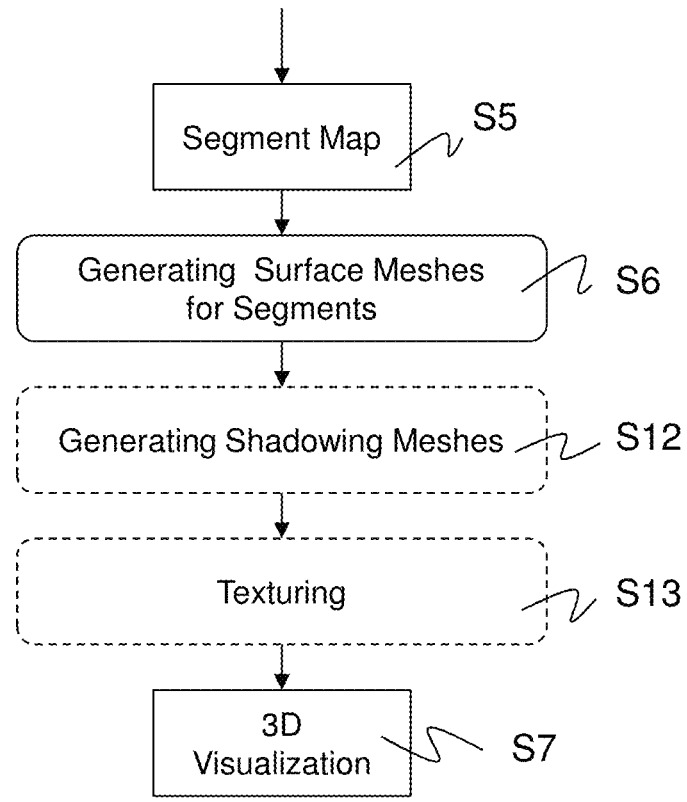
Figure 14:
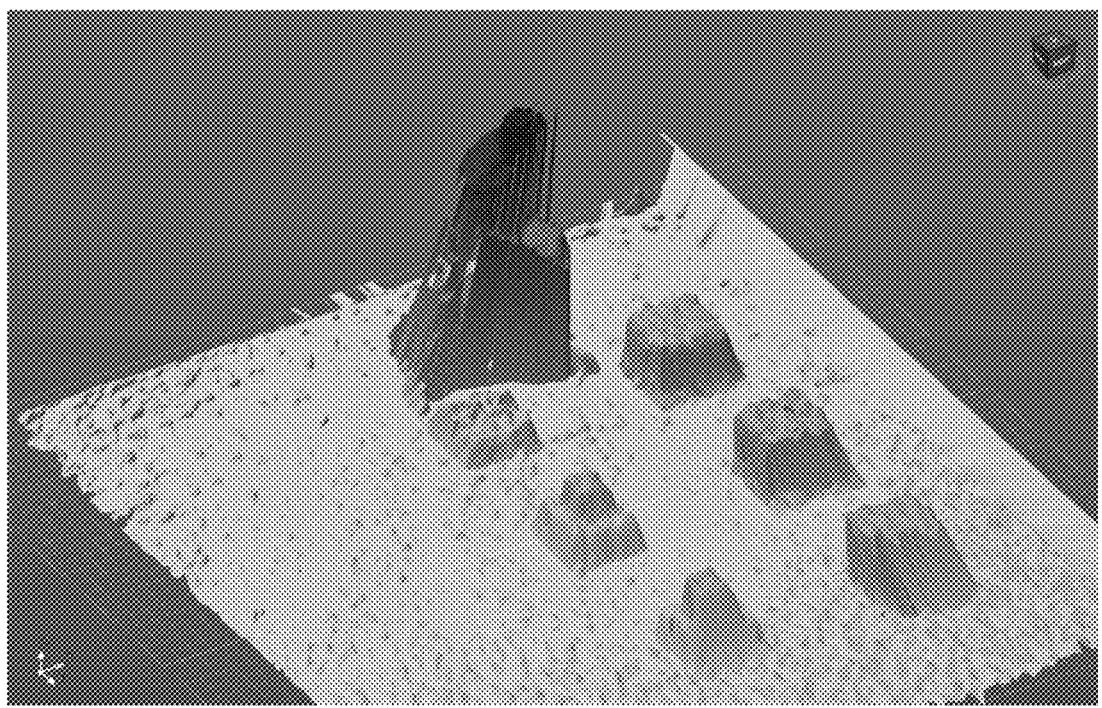
Figure 15:
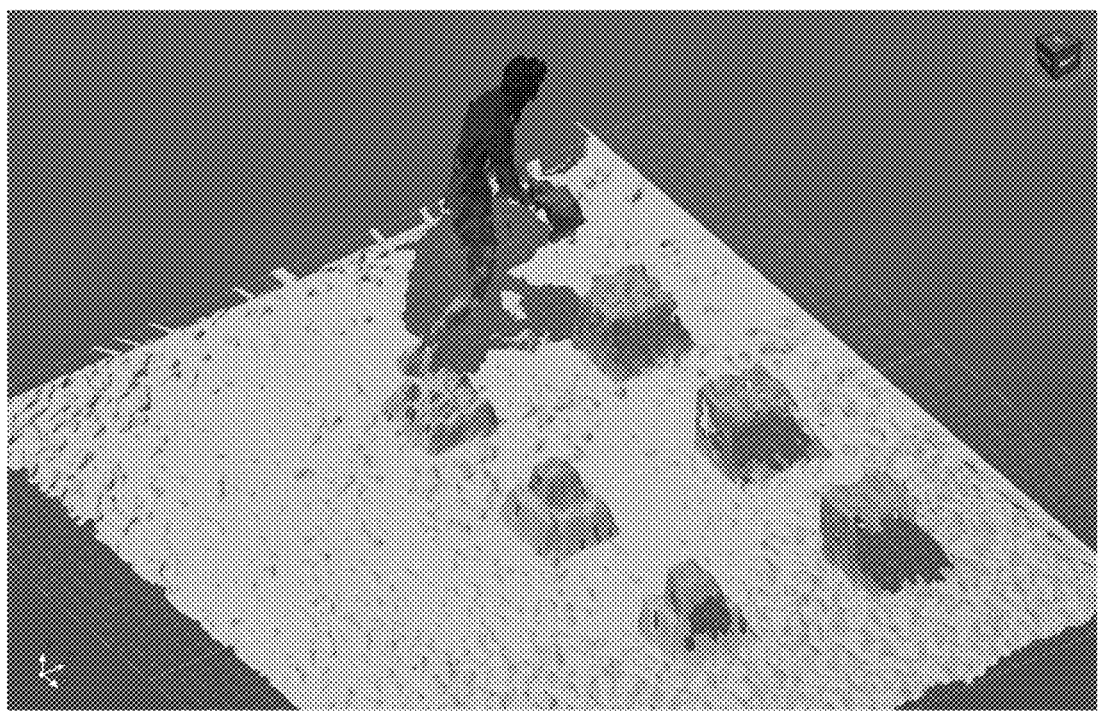
Figure 16:

The invention will be explained in the following also with respect to further advantages and features with reference to exemplary embodiments and the enclosed drawing. The Figures of the drawing show in:

FIG. 1 a schematic three-dimensional representation of a 3D camera and its monitored area;

FIG. 2 a side view of an exemplary monitoring situation of the 3D camera;

FIG. 3 an exemplary depth map which the 3D camera acquires in the monitoring situation of FIG. 2;

FIG. 4 an exemplary flow diagram for generating a 3D visualization from a depth map;

FIG. 5 an exemplary section of a depth map and a segmentation generated using Δz-limited CCL;

FIG. 6*a* a two-dimensional representation of surface meshes for the connected segments according to the segmentation of FIG. 5;

FIG. 6-*b* a two-dimensional representation of shadowing meshes based on connected segments according to the segmentation of FIG. 5;

FIG. 7 an exemplary three-dimensional representation of a surface mesh;

FIG. 8 a side view of the exemplary monitoring situation of FIG. 2 with additional lines of sight of the 3D camera;

FIG. 9*a* a representation of the surface contour in the monitoring situation of FIG. 8;

FIG. 9*b* a representation of the connected segments found by Δz-limited CCL for the monitoring situation of FIG. 8;

FIG. 9*c* a representation as in FIG. 9*b*, but additionally with shadowing in dotted lines;

FIG. 10 an exemplary flowchart for generating a 3D visualization with two optional background segmentations;

FIG. 11*a* a side view of an exemplary surface without background segmentation;

FIG. 11*b* a side view of the surface according to FIG. 11*a* with background segmentation by means of a height threshold evaluation of the 3D points;

FIG. 11c a side view of the surface according to FIG. 11a with background segmentation by means of a height threshold evaluation of the connected segments;

FIG. 12 an exemplary flowchart to explain a preparatory optional filling of depth maps and/or a downsampling, respectively;

FIG. 13 an exemplary flowchart to explain the optional creation of additional shadowing meshes and the texturing of meshes;

FIG. 14 an exemplary visualization of 3D image data without Δz-limited CCL;

FIG. 15 an exemplary visualization of the 3D image data according to FIG. 14, but now with Δz-limited CCL; and FIG. 16 an exemplary visualization of the 3D image data according to FIG. 15, but additionally with background segmentation and representation of shadowing meshes.

FIG. 1 shows a schematic three-dimensional representation of the general structure of a stereo camera 10 for acquiring or recording a depth map. The stereo camera 10 preferably is designed to be fail-safe in accordance with safety standards such as those mentioned in the introduction. The stereo camera 10 is just one example of a 3D sensor according to the invention that is used to explain the acquisition of 3D image data. Other 3D cameras with acquisition principles such as image correlation and projected illumination patterns or determination of light time of flight as well as laser scanners are also possible.

In order to monitor a spatial area 12, two camera modules 14a, 14b are mounted at a known fixed distance from each other, and each acquires images of the spatial area 12. Each camera has an image sensor 16a, 16b, for example a matrix-shaped imager chip that acquires a rectangular pixel image, such as a CCD or CMOS sensor. The two image sensors 16a, 16b together form a 3D image sensor for the acquisition of a depth map. An objective 18a, 18b having imaging optics, which can be any known imaging objective, is assigned to each of the image sensors 16a, 16b. The maximum viewing angle of these optics is shown in FIG. 1 by dotted lines, each forming a viewing pyramid 20a, 20b.

An illumination unit 22 is provided between the two image sensors 16a and 16b in order to illuminate spatial area 12 with a structured pattern. The stereo camera as shown is therefore configured for active stereoscopy, with the pattern generating contrasts that can be evaluated everywhere even in a scenery that has no structure in itself. Alternatively, no or homogeneous illumination is provided in order to evaluate the natural object structures in spatial area 12, but this may often lead to additional image errors.

A control and evaluation unit 24 is connected to the two image sensors 16a, 16b and the illumination unit 22. The control and evaluation unit 24 can be implemented in various hardware, for example digital components such as microprocessors, ASICs (Application Specific Integrated Circuits), FPGAs (Field Programmable Gate Arrays), GPUs (Graphics Processing Units) or mixtures thereof, which can be distributed arbitrarily between internal and external components, wherein external components can also be integrated via network or a cloud, as long as latencies can be controlled or tolerated. Since the generation of the depth map and its evaluation are very computation-intensive, an at least partially parallel architecture is preferably used.

The control and evaluation unit 24 generates the structured illumination pattern with the aid of the illumination unit 22 and receives image data from the image sensors 16a, 16b. Using this image data and a stereoscopic disparity estimation, it calculates the 3D image data or the depth map of spatial area 12. The entire detectable spatial area 12 or the working area can be restricted via a configuration, for example in order to exclude interfering or unnecessary areas.

An important safety-related application of the stereo camera 10 is the monitoring of a machine 26, which is symbolized by a robot in FIG. 1. Machine 26 can also be much more complex than shown, consist of many parts or even be an arrangement of several machines, such as several robots or robot arms. The control and evaluation unit 24 checks where an object 28, represented as a person, is located in relation to machine 26.

For this purpose, a danger zone model of machine 26 is advantageously used. A danger zone is a spatial area in which the machine carries out 26 work movements in a given period of time. The danger zone can surround the machine 26 with some distance to allow sufficient leeway for the working movements. In addition, it is advantageous for the calculations to define geometrically simple danger zones such as cuboids or spheres, while accepting some empty spaces for easier geometry. If necessary, several danger zones may surround several machines and/or several movable sections of a machine. Danger zones can be rigid and include all conceivable working movements. Alternatively, danger zones are defined for steps of the working movement, which are used in a sequence corresponding to the process and which are smaller and better adapted.

The control and evaluation unit 24 determines the shortest distance of all objects 26 to the respective danger zones. The shortest distance is output via a safe interface 30, either directly to the machine 26 or to an intermediate system such as a safe controller.

The controller connected to the safe interface 30, be it a higher-level controller or that of the machine 26, evaluates the shortest distance to fulfil a safety function, for example a speed-and-separation monitoring according to ISO/TS 15066, and compares the shortest distance with a required safety distance, for example according to ISO 13855. In the event of a detected danger, a safety-related reaction is initiated, for example to stop the machine 26, slow it down or start an evasive action. Whether this is necessary can depend not only on the shortest distance but also on other conditions such as the speeds or the nature of object 28 and machine area 26 of the impending collision.

As an alternative to the two-stage output of the shortest distances and their subsequent evaluation, a conventional protection zone evaluation in the stereo camera 10 or a controller connected to it with output of a binary safety-related signal is also conceivable.

FIG. 2 shows a schematic side view of a purely exemplary monitoring situation. The stereo camera 10 is mounted above the spatial area 12 to be observed facing downwards. The optical axis points vertically downwards, while a certain inclination is also possible. Monitoring from a bird's eye view is particularly advantageous, but the invention is not limited to this. In the case of a different installation, height values are to be related to a different base area than the floor or transformed according to the different perspective.

FIG. 3 shows a depth map acquired with the stereo camera 10 of the spatial area 12 according to FIG. 2 with a grey value coding for the respective measured distance d. Depending on the 3D sensor, field of view and measuring principle, the regular grid arrangement can be replaced by a different lateral 2D arrangement.

A stereo camera 10 cannot generate real 3D image data, since the closest object point per line of sight covers the structures behind. This is sometimes referred to as 2.5D image data, but here is still referred to as 3D image data for the sake of simplicity. A depth map is therefore a two-dimensional image with coordinates called (u,v), and each pixel contains a value d for the distance measured at that pixel coordinates. Since the stereo camera 10 has the two offset camera modules 14a, 14b, due to the parallax there are areas that are only in the field of view of one of the two camera modules 14a, 14b. This happens not only in border areas, but also behind object edges that cause shadowing or occlusion with respect to one of the two camera modules 14a, 14b. In addition, there is the shadowing or occlusion due to the central perspective already mentioned. Finally, there may also be correlation errors of the stereo algorithm, for example at locations with too little contrast. The depth map is therefore not always complete, but may contain missing points or gaps.

A depth map as shown in FIG. 3, in principle, is a visualization of the 3D image data of the stereo camera 10. However, it is not particularly comprehensible, especially considering that a real scenery is much more complex and the individual objects do not appear as clearly defined in the depth map as in this simple example. For the configuration of the stereo camera 10 and any systems connected to it, in particular danger zones, protection zones or the like, a better visualization of 3D image data is desired, which enables the best possible intuitive and accurate spatial and, if necessary, temporal understanding of the measured values. However, this is not possible with a depth map having grey coding as in FIG. 3, because in this visualization it is difficult or even impossible to correctly imagine the height contours and objects, especially the relevant shadowing.

FIG. 4 shows an exemplary flowchart for a method for the visualization of 3D image data. Starting point in step S1 are the measured values of the stereo camera 10, for example in the form of tuples (u,v,d) with a depth value per lateral pixel, i.e. a depth map as shown with gray values in FIG. 3. The tuples form a uniform grid in (u,v)-space, but the method does not necessarily depend on that. The resolution of the depth map corresponds at most to the resolution of a single camera image. To simplify matters, it is initially assumed that there are no missing points or gaps. Missing points require special safety treatment. Optionally, reproducible missing points can be visualized separately.

The measured values (u,v,d) are initially available in camera coordinates. In a step S2 they are transformed into world coordinates, preferably into Cartesian triples (x,y,z) of 3D space. The necessary transformation results from the position of the stereo camera 10 in space including its orientation and imaging geometry. The corresponding calibration is not only required for visualization, but also for the monitoring task of the stereo camera 10.

After the transformation, each original (u,v,d) tuple has become a Cartesian (x,y,z) tuple in a step S3. The origin of the 3D coordinate system is largely freely selectable.

However, it is advantageous and is assumed in the following that the z-coordinate perpendicular to the actual ground or floor is directed upwards and has the value z=0 at the floor.

In a step S4, there follows a specific segmentation of the depth map in order to identify the objects. FIG. 5 shows in its left part a simplified section of a depth map with only single-digit height values. It should again be pointed out that the depth maps shown are now available in (x,y,z)-coordinates, the height values are therefore the z-values at the respective positions (x,y).

This set of points is segmented in step S4 by a modified Connected Components Labeling (CCL) procedure. Adjacent (x,y) points are considered as potentially connected. This can be done either with connectivity four or eight, i.e. the diagonal neighborhood can be included or not. However, it has been shown that better results are achieved with a neighborhood of eight.

As an additional condition that two points are to be connected in one segment, a $\Delta z$ limiting is used, based on the difference of the z-coordinates of the two points. If this difference exceeds a height threshold value to be defined, which may also be called depth threshold value depending on the perspective, then the potentially connected two points do not belong to the same segment despite their lateral neighborhood. The $\Delta z$ limitation is motivated by a plausibility approach, namely that along the visual axes of the stereo camera 10 larger jumps in depth values are usually due to object edges and thus due to separate objects in space.

Thus, in a step S5, a segment map is obtained. FIG. 5 shows in its right hand part an example of the connected segments 32 resulting from $\Delta z$-limited Connected Components Labeling with a height threshold $\Delta z<4$. This kind of segmentation is particularly useful for a stereo camera 10. This is because the stereo process typically creates missing points along the edges of objects. Segments are thus additionally separated by such artificial edges from missing points. This is especially true in the vicinity of the optical axis, where missing points at object edges are increased by the parallax of the two camera modules 14a and 14b.

Figure 6B:
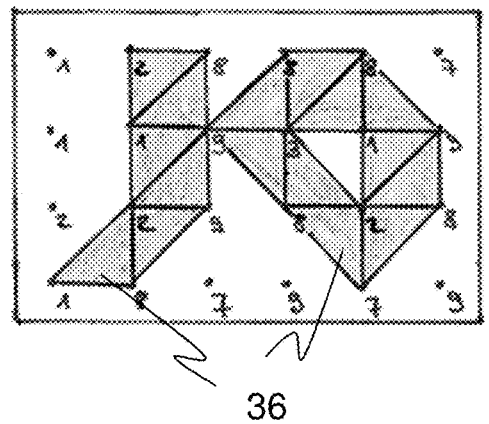

In a step S6, 32 surface meshes 34 are generated for the respective connected segments. This is shown in FIG. 6a as an example for the segments 32 from FIG. 5. FIG. 6b shows corresponding optional shadowing meshes 36 for shaded areas between outer edges of segments 32, which are explained in more detail below.

A surface mesh 34 consists of triangles, so that in each case three points are to be determined between which a mesh triangle is generated. Here, the initial lateral 2D arrangement of the measuring points in the original depth map, i.e. their (u,v)-coordinates, are used for this purpose. In that 2D arrangement, direct neighbors are connected to form triangles. A triangle is formed for example between (u,v), (u+1,v) and (u,v+1). In the surface mesh 34, of course, not the two-dimensional coordinates but the corresponding three-dimensional coordinates (x,y,z) are used. Due to the regular grid structure, complex meshing methods such as Delaunay triangulation are not necessary.

In a step S7 the surface meshes 34 and if desired the shadowing meshes 36 are displayed in order to intuitively visualize the 3D image data. FIG. 7 shows an example for a mesh 34, 36.

FIGS. 8 and 9a-c again illustrate the method just explained with reference to FIG. 4 in another representation, namely a sectional view from the side. FIG. 8 corresponds to the exemplary representation of a monitoring situation as shown in FIG. 2, with the optical view axes 38 of the stereo camera 10 added as dashed lines in order to better understand the shadowing.

FIG. 9a shows the surface seen by the stereo camera 10, or a contour line corresponding to the sectional view, without segments. FIG. 9b illustrates the resulting connected segments 32 generated by $\Delta z$-limited Connected Components Labeling. In FIG. 9c, the outer edges of each of these segments 32 are also connected to the dotted lines of the optical view axes 38 of the stereo camera 10 in order to include the shadowing.

FIG. 10 shows an exemplary flowchart similar to FIG. 4, supplemented by two optional steps S8, S9 for background segmentation. Thus all embodiments are possible without these steps S8, S9, with only one step S8 or S9 or with both steps S8 and S9. Steps S1 to S7 will not be explained a second time.

A first possible background segmentation according to step S8 is already based on the point cloud. Using a fixed limit value, which corresponds to a height H1 above the ground level at z=0, foreground and background are separated from one another. All measuring points below height H1 belong to the set of background points and are not processed in subsequent steps. The step S8 can be based on the transformed point cloud as shown or alternatively before the transformation in step S2. Then, however, the height H1 must be converted into distances d, which are not everywhere the same for a fixed height above the ground due to the central perspective.

A second possible background segmentation according to step S9 no longer evaluates measuring points (x,y,z), but segments 32. A segment 32 is classified as background if it is below a fixed limit value corresponding to a height H2 above ground level z=0. This is evaluated for example based on the highest point of the segment 32, i.e. the maximum z of all points of segment 32. This for example takes account of a minimum detection height. Alternatively, the height of a segment 32 is determined by an average, a center of gravity or another appropriate measure. The height H2 as well as the height H1 is in principle freely selectable. If both steps S8 and S9 are implemented, only H2>H1 is useful.

FIG. 11 illustrates the background segmentation. FIG. 11a shows an arbitrary contour line as a function of the height z above a line on the ground as a starting point. FIG. 11b shows the limit value at H1. The grey areas below H1 are background. Only measurement points of the foreground from the area above H1 are taken into account when forming segments 32. FIG. 11c additionally shows the limit value at H2. The segment in the middle is below H2 and is therefore regarded as background. This also illustrates the difference between the two steps S8 and S9. The two segments on the right and on the left are also partly below H2. However, these points between H1 and H2 are not excluded, unlike what would happen in a background segmentation according to step S8 with a threshold H2, because these segments as a whole are not background.

FIG. 12 shows another exemplary flowchart explaining optional pre-processing steps. The flow chart corresponds to the upper part of FIG. 4 with steps S1 to S3. There are two further and optional pre-processing steps S10, S11, which can be added individually or in combination.

In a step S10, the depth map can be cleaned up or filled up. As mentioned several times, there are various causes for missing points or gaps in the depth map. It is then possible to add distance values at these missing points, for example by copying or interpolating neighboring values. Since it is only a matter of visualization, this procedure in blind areas of the stereo camera 10 is not safety-critical. If step S10 is omitted, then missing points are either ignored completely in the subsequent steps or fictitious measuring points are placed directly in front of the stereo camera 10 at a distance of zero in order to represent a worst-case assumption for the blind area. More complicated representations, which preferably render the missing points immediately recognizable as such, are also conceivable.

In a step S11, the resolution can be artificially reduced (downsampling) in order to change the granularity of the visualization or to simplify the subsequent computation-intensive steps, in particular the segmentation S4 and the meshing S6. This makes it possible to ensure a smooth and low-latency display without major visual losses even at high resolutions of the depth maps and limited computing capacities. Downsampling means that a coarser (u,v,) or (x,y) grid is selected and the distances d or heights z from the original neighbourhood are adopted or interpolated. In particular, it is averaged via the median. Invalid depth values are ignored. Downsampling can also be done dynamically, in particular depending on the computing capacity of the executing device or the complexity of the scenery. It is thus in particular possible to switch between typical downsampling steps of 1×1, 2×2, 4×4, . . . on a frame-to-frame basis. The trigger can be a user input, but also an automatic evaluation that the current frame rate of the visualization breaks down.

FIG. 13 shows another exemplary flowchart explaining optional post-processing steps. The flow chart corresponds to the lower part of FIG. 4 with steps S5 to S7. There are two further and optional post-processing steps S12, S13, which can be added individually or in combination.

Step S12 is the above-mentioned generation of shadowing meshes 36, which requires the generation of the corresponding mesh triangles between outer edges of segments 32. It is advantageous to create an edge mask that contains all inner and outer edges of the segments 32. On the basis of the edge mask and the values in the depth map, mesh triangles are then generated, wherein, in contrast to the mesh triangles of surface meshes 34, the three points of a mesh triangle belong to at least two different segments 32 in a shadowing mesh 36. The optional background from steps S8, S9 can be regarded as a separate segment.

In a step S13, the surface meshes 34 and/or shadowing meshes 36 are provided with a texture. The texture preferably indicates a height coding by false colors or gray values, be it by monochromatic triangles with a value representative for the height position of the triangle or a height-dependent color or gray value gradient. Another example are the actual textures of the scenery in spatial area 12, which are obtained, for example, from the original images of the camera modules 14a, 14b. Shadowing meshes 36 are preferably textured in a specific way to immediately distinguish them from surface meshes 34, in particular are displayed semi-transparent.

FIGS. 14-16 illustrate the visualization according to invention with exemplary 3D image data of a 3D sensor. As a reference for comparison, FIG. 14 shows surface meshes without Δz-limited Connected Components Labeling according to step S4. The visualization is based on a depth map cleaned up according to step S10 and has a height-coded texture according to step S13.

In the visualization according to FIG. 15, the Δz-limited Connected Components Labeling according to step S4 has taken place, and surface meshes 34 were created on this basis according to step S6. The other pre- and post-processing steps are the same as in FIG. 14.

In the visualization according to FIG. 16, other than in FIG. 15, a background segmentation was performed both according to step S8 and according to step S9. This is reflected in the clear object boundaries on the floor. In addition, shadowing meshes 36 were generated and displayed according to step S12. Some additionally shown sensor measurement data are irrelevant.

The invention claimed is:

1. A method for visualizing 3D image data of a 3D sensor (10), the 3D sensor (10) being a safe sensor in accordance with a safety standard for machine safety or electro-sensitive protective devices, the 3D image data having a plurality of 3D points which form a lateral 2D arrangement with a respective depth value, the method comprising the steps of:

forming connected segments (32) from connected 3D points;

displaying the connected segments (32);

connecting two respective 3D points in the same one of the connected segments (32) when they are laterally adjacent and also differ in their depth value by at most a depth threshold (z);

generating a shadowing mesh (36) for shadowing boundaries (38); and displaying the shadowing mesh (36), wherein the shadowing mesh (36) displays occluded regions where the 3D sensor (10) is blind.

2. The method according to claim 1,
wherein the 3D image data form a depth map.

3. The method according to claim 1,
wherein 3D points are laterally adjacent if they are arranged side by side, one above the other or in diagonal proximity within the 2D arrangement.

4. The method according to claim 3,
wherein 3D points are laterally adjacent if they are in an 8-neighbourhood.

5. The method according to claim 1,
wherein a surface mesh (34) is formed for a connected segment (32) and the segment (32) is displayed as the associated surface mesh (34).

6. The method according to claim 5,
wherein triangles of the surface mesh (34) are formed from 3D points which already are direct neighbors in the lateral 2D arrangement.

7. The method according to claim 1,
wherein an edge mask of inner and outer edges of the segments (32) is generated and triangles of the shadowing mesh (36) are formed on the basis of the edge mask between adjacent, different segments (32).

8. The method according to claim 5,
wherein the mesh (34, 36) is displayed with a texture.

9. The method according to claim 8,
wherein the mesh (34, 36) is displayed with a depth value dependent color coding or gray coding.

10. The method according to claim 1,
where the 3D points are transformed into world coordinates.

11. The method according to claim 10,
wherein the 3D points are transformed into Cartesian world coordinates with a height axis (z) perpendicular to a base area.

12. The method according to claim 1,
wherein 3D points whose depth values do not reach a minimum height (H1) above a base area are discarded.

13. The method according to claim 1,
wherein connected segments (32) which do not reach a minimum height (H2) above a base area are discarded.

14. The method according to claim 1,
wherein missing points in the lateral 2D arrangement for which the 3D sensor (10) has not measured a valid depth value are filled with 3D points whose depth value is determined from depth values of adjacent 3D points.

15. The method according to claim 1,
wherein the resolution of the lateral 2D arrangement is reduced by generating a smaller number of 3D points from the 3D points depending on at least one of currently available computing capacities and the effort required for visualizing the currently acquired 3D image data.

16. The method according to claim 1,
wherein the visualization takes place during the acquisition or transfer of 3D image data.

17. The method according to claim 1,
wherein the 3D image data are recorded by a 3D camera or a stereo camera.

18. An optoelectronic 3D sensor (10) comprising:
at least one light receiver (16a-b) for acquiring 3D image data from a monitoring region (12);

a control and evaluation unit (24) which is configured for a method of visualizing acquired 3D image data with a plurality of 3D points which form a lateral 2D arrangement with a respective depth value, wherein connected segments (32) are formed from connected 3D points and the connected segments (32) are displayed, and wherein two respective 3D points are connected in the same connected segment (32) when they are laterally adjacent and also differ in their depth value by at most a depth threshold (z), wherein the control and evaluation unit (24) is further configured to generate a shadowing mesh (36) for shadowing boundaries (38); and a display for displaying the 3D image data, wherein the 3D sensor (10) is a safe sensor in accordance with a safety standard for machine safety or electro-sensitive protective devices, and wherein the display further displays the shadowing mesh (36), wherein the shadowing mesh (36) displays occluded regions where the optoelectronic 3D sensor (10) is blind.

19. The optoelectronic sensor (10) according to claim 18, which is configured as a 3D camera or a stereo camera.

* * * * *